(12) United States Patent
Anderson

(10) Patent No.: US 8,709,166 B2
(45) Date of Patent: Apr. 29, 2014

(54) ECONOMICAL, FOOD-SAFE EXTRACTION OF BISPHENOLS

(75) Inventor: Kraig Anderson, Burlingame, CA (US)

(73) Assignee: Empire Technology Development LLC, Wilmington, DE (US)

( * ) Notice: Subject to any disclaimer, the term of this patent is extended or adjusted under 35 U.S.C. 154(b) by 541 days.

(21) Appl. No.: 13/126,115

(22) PCT Filed: Dec. 22, 2010

(86) PCT No.: PCT/US2010/061778
§ 371 (c)(1),
(2), (4) Date: Apr. 26, 2011

(87) PCT Pub. No.: WO2012/087307
PCT Pub. Date: Jun. 28, 2012

(65) Prior Publication Data
US 2012/0164699 A1 Jun. 28, 2012

(51) Int. Cl.
*B08B 9/08* (2006.01)
*B08B 3/08* (2006.01)
*B08B 3/10* (2006.01)

(52) U.S. Cl.
USPC ....... 134/22.19; 134/25.2; 568/723; 568/724; 568/749; 521/40

(58) Field of Classification Search
CPC ........ C07C 37/70; C07C 37/72; C07C 37/86; C07C 37/685; C07C 39/04; C08J 11/04; C08J 11/08
USPC ........... 568/723, 724, 749; 134/22.19; 521/40
See application file for complete search history.

(56) References Cited

U.S. PATENT DOCUMENTS

| | | | |
|---|---|---|---|
| 4,195,006 A | 3/1980 | Brown et al. | |
| 5,198,096 A | 3/1993 | Foust et al. | |
| 5,391,692 A | 2/1995 | Boden et al. | |
| 5,817,183 A | 10/1998 | Eddy-Helenek et al. | |
| 6,090,860 A * | 7/2000 | Peters et al. | 521/48 |
| 6,420,511 B1 | 7/2002 | Kharul et al. | |
| 2007/0036903 A1 | 2/2007 | Mayr et al. | |

FOREIGN PATENT DOCUMENTS

| | | |
|---|---|---|
| DE | 255527 | 4/1998 |
| WO | WO-2005/052029 | 6/2005 |

OTHER PUBLICATIONS

Rosenfeldt et al., "Degradation of Endocrine Disrupting Chemicals Bisphenol A, Ethinyl Estradiol, and Estradiol during UV Photolysis and Advanced Oxidation Processes", Environ,. Sci. Technol. 2004, 38, 5476-83.*
Tabata et al., "The effect of bisphenol A and chlorinated derivatives of bisphenol A on the level of serum vitellogenin in Japanese medaka (*Oryzias latipes*)", Water Sci. Technol. 2004; 50(5): 125-32.*
Bautista-Toledo, I., et al., "Bisphenol A Removal from Water by Activated Carbon. Effects of Carbon Characteristics and Solution Chemistry," *Environ. Sci. Technol.*, 2005, vol. 39, No. 16, pp. 6246-6250.
HSDB—Hazardous Substances Data Bank, "Benzethonium Chloride," U.S. National Library of Medicine's TOXNET system, printed on Apr. 4, 2011, retrieved from the internet: <URL: http://toxnet.nlm.nih.gov/cgi-bin/sis/search/r?dbs hsdb:@term @rn 121-54-0>, 16 pages.
HSDB—Hazardous Substances Data Bank, "Cetylpyridinium Chloride," U.S. National Library of Medicine's TOXNET system, printed on Apr. 4, 2011, retrieved from the internet: <URL: http://toxnet.nlm.nih.gov/cgi-bin/sis/search/r?dbs hsdb:@term @rn 123-03-5>, 21 pages.
International Search Report and Written Opinion for PCT/US2010/061778 mailed Feb. 10, 2011.
Makosza, M., "Phase-transfer catalysis. A general green methodology in organic synthesis," Pure Appl. Chem., 2000, vol. 72, No. 7, pp. 1399-1403.
Metzger, J. O., "Solvent-Free Organic Syntheses," Angewandte Chemie International Edition, 1998, vol. 37, No. 21, pp. 2975-2978.
Montanari, A. et al., "Quality of organic coatings for food cans: evaluation techniques and prospects of improvement," Progress in Organic Coatings, 1996, vol. 29, pp. 159-165.
Staples, C. A. et al., "A review of the environmental fate, effects, and exposures of bisphenol A," Chemosphere, 1998, vol. 36, No. 10, pp. 2149-2173.
Tanaka, S. et al., "Electrochemical decomposition of bisphenol A using Pt/Ti and $SnO_2$/Ti anodes," J. Appl. Electrochem., 2002, vol. 32, pp. 197-201.
Wang, M. et al., "Kinetic Study of Synthesizing Bisphenol A Diallyl Ether in a Phase-Transfer Catalytic Reaction," Bull. Chem. Soc. Jpn., 2006, vol. 79, No. 1, pp. 80-87.

* cited by examiner

*Primary Examiner* — Michael Kornakov
*Assistant Examiner* — Natasha Campbell
(74) *Attorney, Agent, or Firm* — Foley & Lardner LLP

(57) ABSTRACT

Methods for extracting bisphenols from polymer substrates are described. The methods include contacting the polymer substrate with an aqueous composition which includes a phase transfer agent, a base and optionally an oxidant, whereby the bisphenol is extracted into the aqueous composition. Suitable phase transfer agents are delineated. Also described are compositions which can be used in the present methods.

29 Claims, No Drawings

ECONOMICAL, FOOD-SAFE EXTRACTION OF BISPHENOLS

CROSS-REFERENCE TO RELATED APPLICATIONS

The present application is a U.S. national stage application claiming the benefit of International Application No. PCT/US2010/061778, filed on Dec. 22, 2010, the entire contents of which is incorporated herein by reference in its entirety.

TECHNICAL FIELD

The present technology relates generally to compositions and methods for extracting bisphenol from substrates.

BACKGROUND

The following description is provided to assist the understanding of the reader. None of the information provided or references cited is admitted to be prior art.

Bisphenols constitute a family of compounds, which includes many substances that have as a common chemical structure two phenolic rings joined together through a bridging carbon. Various bisphenols and their derivatives have been synthesized and evaluated for use in a variety of industrial products, including polymers. Since these compounds are very widely used in industry, particularly in plastics, potential exposure of human beings to them is becoming a significant point of discussion. Some have expressed concern because bisphenols exhibit endocrine-disrupting activity, in which they mimic or antagonize the biological functions of natural hormones. Because of this, their use in several consumer products, such as, e.g., linings for food and beverage cans can be problematic. These linings may permit bisphenols, such as Bisphenol-A (2,2-bis(4-hydroxyphenyl) propane; BPA), to migrate into the food and beverage contents, placing consumers directly in harm's way through BPA's potential effect on development of the male reproductive system, similarities with the known human carcinogen and teratogen, diethylstilbestrol, estrogenic effects on animals in the ecosystem, and many other negative effects.

Previously proposed solutions such as non-BPA-containing coatings and dual-layer BPA-barrier coatings are associated drawbacks such as, e.g., lack of coating efficacy and poor integration into existing canning processes. Further, proposed alternatives, such as single-layer replacement linings, suffer from disadvantages such as flavor contamination, inability to withstand retorting temperatures, the need for sterilization, insufficient flexibility for processing, and lack of chemical resistance. Proposed double layer linings involve comparatively elaborate processing and are, therefore, prohibitively expensive. Moreover, any proposed replacement lining may have unanticipated issues simply due to a lack of the decades of experience and process improvement known for existing linings. In essence, existing linings are far superior to other proposed linings in many different respects and suffer only from the presence of BPA. Therefore, a desirable method for reducing BPA migration from can linings is cheap, effective, food-safe, and easily integrated into the canning process, and at the same time, matches or preserves the many advantages of existing linings.

SUMMARY

In accordance with one aspect, a method is provided for extracting a bisphenol from various substrates. In one embodiment, the present disclosure provides a method for extracting a bisphenol from a polymer substrate which includes contacting the polymer substrate with an aqueous composition comprising a phase transfer agent and a base, whereby the bisphenol is extracted into the aqueous composition.

In another aspect, a method for removing Bisphenol-A from food can linings is provided. In some embodiments, the method includes contacting the can lining with an aqueous composition, wherein the composition includes a) cetylpyridinium chloride, b) potassium carbonate and/or sodium carbonate, and c) sodium hypochlorite.

DETAILED DESCRIPTION

In the following detailed description, the illustrative embodiments described in the detailed description, figures, and claims are not meant to be limiting. Other embodiments may be utilized, and other changes may be made, without departing from the spirit or scope of the subject matter presented here. In the description that follows, a number of terms are used extensively. The terms described below are more fully understood by reference to the specification as a whole. Units, prefixes, and symbols may be denoted in their accepted SI form.

The terms "a" and "an" as used herein mean "one or more" unless the singular is expressly specified. Thus, for example, reference to "a base" includes a mixture of two or more bases, as well as a single base.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to, plus or minus 10% of the particular term.

The terms "optional" and "optionally" mean that the subsequently described circumstance may or may not occur, so that the description includes instances where the circumstance occurs and instances where it does not.

Generally, reference to a certain element such as hydrogen or H is meant to include all isotopes of that element. For example, if an R group is defined to include hydrogen or H, it also includes deuterium and tritium. Compounds comprising radioisotopes such as tritium, $C^{14}$, $P^{32}$ and $S^{35}$ are thus within the scope of the technology. Procedures for inserting such labels into the compounds of the technology will be readily apparent to those skilled in the art based on the disclosure herein.

In general, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group is substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

Substituted ring groups such as substituted cycloalkyl, aryl, heterocyclyl and heteroaryl groups also include rings and ring systems in which a bond to a hydrogen atom is replaced with a bond to a carbon atom. Therefore, substituted cycloalkyl, aryl, heterocyclyl and heteroaryl groups may also be substituted with substituted or unsubstituted alkyl, alkenyl, and alkynyl groups as defined below.

Alkyl groups include straight chain and branched chain alkyl groups having from 1 to 12 carbon atoms, and typically from 1 to 10 carbons or, in some embodiments, from 1 to 8, 1 to 6, or 1 to 4 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above and include, without limitation, haloalkyl (e.g., trifluoromethyl), hydroxyalkyl, thioalkyl, aminoalkyl, alkylaminoalkyl, dialkylaminoalkyl, alkoxyalkyl, carboxyalkyl, and the like.

Cycloalkyl groups include mono-, bi- or tricyclic alkyl groups having from 3 to 12 carbon atoms in the ring(s), or, in some embodiments, 3 to 10, 3 to 8, or 3 to 4, 5, or 6 carbon atoms. Exemplary monocyclic cycloalkyl groups include, but are not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments, the number of ring carbon atoms ranges from 3 to 5, 3 to 6, or 3 to 7. Bi- and tricyclic ring systems include both bridged cycloalkyl groups and fused rings, such as, but not limited to, bicyclo[2.1.1]hexane, adamantyl, decalinyl, and the like. Substituted cycloalkyl groups may be substituted one or more times with non-hydrogen and non-carbon groups as defined above. However, substituted cycloalkyl groups also include rings that are substituted with straight or branched chain alkyl groups as defined above. Representative substituted cycloalkyl groups may be mono-substituted or substituted more than once, such as, but not limited to, 2,2-, 2,3-, 2,4-2,5- or 2,6-disubstituted cyclohexyl groups, which may be substituted with substituents such as those listed above.

Aryl groups are cyclic aromatic hydrocarbons that do not contain heteroatoms. Aryl groups herein include monocyclic, bicyclic and tricyclic ring systems. Thus, aryl groups include, but are not limited to, phenyl, azulenyl, heptalenyl, biphenyl, fluorenyl, phenanthrenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. In some embodiments, the aryl groups are phenyl or naphthyl. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Representative substituted aryl groups may be mono-substituted or substituted more than once. For example, monosubstituted aryl groups include, but are not limited to, 2-, 3-, 4-, 5-, or 6-substituted phenyl or naphthyl groups, which may be substituted with substituents such as those listed above.

Aralkyl groups are alkyl groups as defined above in which a hydrogen or carbon bond of an alkyl group is replaced with a bond to an aryl group as defined above. In some embodiments, aralkyl groups contain 7 to 16 carbon atoms, 7 to 14 carbon atoms, or 7 to 10 carbon atoms. Substituted aralkyl groups may be substituted at the alkyl, the aryl or both the alkyl and aryl portions of the group. Representative aralkyl groups include but are not limited to benzyl and phenethyl groups and fused (cycloalkylaryl)alkyl groups such as 4-indanylethyl. Representative substituted aralkyl groups may be substituted one or more times with substituents such as those listed above.

Heterocyclyl groups include aromatic (also referred to as heteroaryl) and non-aromatic ring compounds containing 3 or more ring members of which one or more is a heteroatom such as, but not limited to, N, O, and S. In some embodiments, the heterocyclyl group contains 1, 2, 3 or 4 heteroatoms. In some embodiments, heterocyclyl groups include mono-, bi- and tricyclic rings having 3 to 16 ring members, whereas other such groups have 3 to 6, 3 to 10, 3 to 12, or 3 to 14 ring members. Heterocyclyl groups encompass aromatic, partially unsaturated and saturated ring systems, such as, for example, imidazolyl, imidazolinyl and imidazolidinyl groups. The phrase "heterocyclyl group" includes fused ring species including those comprising fused aromatic and non-aromatic groups, such as, for example, benzotriazolyl, 2,3-dihydrobenzo[1,4]dioxinyl, and benzo[1,3]dioxolyl. The phrase also includes bridged polycyclic ring systems containing a heteroatom such as, but not limited to, quinuclidyl. However, the phrase does not include heterocyclyl groups that have other groups, such as alkyl, oxo or halo groups, bonded to one of the ring members. Rather, these are referred to as "substituted heterocyclyl groups." Heterocyclyl groups include, but are not limited to, aziridinyl, azetidinyl, pyrrolidinyl, imidazolidinyl, pyrazolidinyl, thiazolidinyl, tetrahydrothiophenyl, tetrahydrofuranyl, dioxolyl, furanyl, thiophenyl, pyrrolyl, pyrrolinyl, imidazolyl, imidazolinyl, pyrazolyl, pyrazolinyl, triazolyl, tetrazolyl, oxazolyl, isoxazolyl, thiazolyl, thiazolinyl, isothiazolyl, thiadiazolyl, oxadiazolyl, piperidyl, piperazinyl, morpholinyl, thiomorpholinyl, tetrahydropyranyl, tetrahydrothiopyranyl, oxathiane, dioxyl, dithianyl, pyranyl, pyridyl, pyrimidinyl, pyridazinyl, pyrazinyl, triazinyl, dihydropyridyl, dihydrodithiinyl, dihydrodithionyl, homopiperazinyl, quinuclidyl, indolyl, indolinyl, isoindolyl, azaindolyl(pyrrolopyridyl), indazolyl, indolizinyl, benzotriazolyl, benzimidazolyl, benzofuranyl, benzothiophenyl, benzthiazolyl, benzoxadiazolyl, benzoxazinyl, benzodithiinyl, benzoxathiinyl, benzothiazinyl, benzoxazolyl, benzothiazolyl, benzothiadiazolyl, benzo[1,3]dioxolyl, pyrazolopyridyl, imidazopyridyl (azabenzimidazolyl), triazolopyridyl, isoxazolopyridyl, purinyl, xanthinyl, adeninyl, guaninyl, quinolinyl, isoquinolinyl, quinolizinyl, quinoxalinyl, quinazolinyl, cinnolinyl, phthalazinyl, naphthyridinyl, pteridinyl, thianaphthyl, dihydrobenzothiazinyl, dihydrobenzofuranyl, dihydroindolyl, dihydrobenzodioxinyl, tetrahydroindolyl, tetrahydroindazolyl, tetrahydrobenzimidazolyl, tetrahydrobenzotriazolyl, tetrahydropyrrolopyridyl, tetrahydropyrazolopyridyl, tetrahydroimidazopyridyl, tetrahydrotriazolopyridyl, and tetrahydroquinolinyl groups. Representative substituted heterocyclyl groups may be mono-substituted or substituted more than once, such as, but not limited to, pyridyl or morpholinyl groups, which are 2, 3-, 4-, 5-, or 6-substituted, or disubstituted with various substituents such as those listed above.

Heteroaryl groups are aromatic ring compounds containing 5 or more ring members, of which one or more is a heteroatom such as, but not limited to, N, O, and S. Heteroaryl groups include, but are not limited to, groups such as pyrrolyl, pyrazolyl, triazolyl, tetrazolyl, oxazolyl, isoxazolyl, thiazolyl, pyridinyl, pyridazinyl, pyrimidinyl, pyrazinyl, thiophenyl, benzothiophenyl, furanyl, benzofuranyl, indolyl, azaindolyl(pyrrolopyridinyl), indazolyl, benzimidazolyl, imidazopyridinyl(azabenzimidazolyl), pyrazolopyridinyl, triazolopyridinyl, benzotriazolyl, benzoxazolyl, benzothiazolyl, benzothiadiazolyl, imidazopyridinyl, isoxazolopyridinyl, thianaphthyl, purinyl, xanthinyl, adeninyl, guaninyl, quinolinyl, isoquinolinyl, tetrahydroquinolinyl, quinoxalinyl, and quinazolinyl groups. Heteroaryl groups include fused ring compounds in which all rings are aromatic such as indolyl groups and include fused ring compounds in which only one of the rings is aromatic, such as 2,3-dihydro indolyl groups. Although the phrase "heteroaryl groups" includes fused ring compounds, the phrase does not include heteroaryl groups that have other groups bonded to one of the ring members, such as alkyl groups. Rather, heteroaryl groups with such substitution are referred to as "substituted heteroaryl groups." Representative substituted heteroaryl groups may be substituted one or more times with various substituents such as those listed above.

Heteroaralkyl groups are alkyl groups as defined above in which a hydrogen or carbon bond of an alkyl group is replaced with a bond to a heteroaryl group as defined above. Substituted heteroaralkyl groups may be substituted at the alkyl, the heteroaryl or both the alkyl and heteroaryl portions of the group. Representative substituted heteroaralkyl groups may be substituted one or more times with substituents such as those listed above.

Groups described herein having two or more points of attachment (i.e., divalent, trivalent, or polyvalent) within the compound of the technology are designated by use of the suffix, "ene." For example, divalent alkyl groups are alkylene groups, divalent aryl groups are arylene groups, divalent heteroaryl groups are heteroarylene groups, and so forth. Substituted groups having a single point of attachment to the compound of the technology are not referred to using the "ene" designation. Thus, for example, chloroethyl is not referred to herein as chloroethylene.

Alkoxy groups are hydroxyl groups (—OH) in which the bond to the hydrogen atom is replaced by a bond to a carbon atom of a substituted or unsubstituted alkyl group as defined above. Examples of linear alkoxy groups include, but are not limited to, methoxy, ethoxy, propoxy, butoxy, pentoxy, hexoxy, and the like. Examples of branched alkoxy groups include, but are not limited to, isopropoxy, sec-butoxy, tert-butoxy, isopentoxy, isohexoxy, and the like. Examples of cycloalkoxy groups include, but are not limited to, cyclopropyloxy, cyclobutyloxy, cyclopentyloxy, cyclohexyloxy, and the like. Representative substituted alkoxy groups may be substituted one or more times with substituents such as those listed above.

The term "amine" (or "amino"), as used herein, refers to $NR_5R_6$ groups, wherein $R_5$ and $R_6$ are independently hydrogen, or a substituted or unsubstituted alkyl, alkenyl, alkynyl, cycloalkyl, aryl, aralkyl, heterocyclylalkyl or heterocyclyl group as defined herein. In some embodiments, the amine is alkylamino, dialkylamino, arylamino, or alkylarylamino. In other embodiments, the amine is $NH_2$, methylamino, dimethylamino, ethylamino, diethylamino, propylamino, isopropylamino, phenylamino, or benzylamino. The term "alkylamino" is defined as $NR_7R_8$, wherein at least one of $R_7$ and $R_8$ is alkyl and the other is alkyl or hydrogen. The term "arylamino" is defined as $NR_9R_{10}$, wherein at least one of $R_9$ and $R_{10}$ is aryl and the other is aryl or hydrogen.

The term "halogen" or "halo," as used herein, refers to bromine, chlorine, fluorine, or iodine. In some embodiments, the halogen is fluorine. In other embodiments, the halogen is chlorine or bromine.

Bisphenols are a class of phenolic compounds which are widely employed in the manufacture of industrial and consumer products, though some are known to exhibit endocrine-disrupting activity. For example, Bisphenol-A (2,2-bis-(4-hydroxyphenyl)propane; BPA) is a popular industrial raw material for polycarbonate and epoxy resins. Other bisphenols such as bisphenol B (2,2-bis-(4-hydroxyphenyl)butane; BPB), bisphenol F (4,4'-dihydroxydiphenylmethane; BPF), bisphenol AD (ethylidenebisphenol; BPAD), bisphenol AF (1,3-trifluoro-2,2-bis-(4-hydroxyphenyl)propane; BPAF), tetramethylbisphenol A (2,2-bis-(3,5-dimethyl-4-hydroxyphenyl)propane; TMBPA), 3,3'-dimethylbisphenol A (DMBPA), and bisphenol S (bis-(4-hydroxyphenyl)sulfone; BPS) are also used as materials for polycarbonate resin. Tetrabromobisphenol A (2,2-bis-(3,5-dibromo-4-hydroxyphenyl)propane; TBBPA), a halogenated derivative of BPA, is also widely used throughout the world as a flame retardant in numerous products. Tetrachlorobisphenol A (2,2-bis-(3,5-dichloro-4-hydroxyphenyl)propane; TCBPA) has been found in the effluent from waste-paper recycling plants. Other bisphenol derivatives such as 2,2-bis-(4-Hydroxyphenyl)-1-propanol (BPA ol), 2,2-bis-(4-hydroxyphenyl)-1-propionic acid (BPA carboxylic acid), 1,1-bis-(4-hydroxyphenyl)cyclohexane (BPCH), α,α'-bis-(4-hydroxyphenyl)-1,4-diisopropylbenzene (BPDB) also find use in various industries.

In various aspects, methods are provided for extracting bisphenols from substrates including polymer substrates.

In accordance with one aspect, the present technology relates to a method for extracting a bisphenol from various substrates. The methods include extracting a bisphenol from a polymer substrate, by contacting the polymer substrate with an aqueous composition. The aqueous composition includes a phase transfer agent and a base such that the bisphenol is extracted into the aqueous composition.

Bisphenol compounds intended to be removed or extracted will be readily evident to those skilled in the art. Various bisphenols, such as those listed above, e.g., BPA, BPB, BPF, BPAD, BPAF, TMBPA, DMBPA, BPS, TBBPA, TCBPA, BPCH, BPDP and their analogues and derivatives, can be extracted using the present methods. In illustrative embodiments, the bisphenol is Bisphenol-A.

The aqueous compositions used may include one or more of each of phase transfer agents, bases and oxidants. In some embodiments, the composition includes only a phase transfer agent. In some embodiments, the composition includes a phase transfer agent and a base. In some embodiments, the composition includes a phase transfer agent and an oxidant. In some embodiments, the composition includes a phase transfer agent, a base and an oxidant.

Phase transfer agents or catalysts are well known in the art. For example, see "Phase-Transfer Catalysis: Fundamentals, Applications and Industrial Perspectives," by Starks, Liotta and Halpern (Chapman and Hall, 1994) and "Handbook of Phase Transfer Catalysis," by Sasson, Y. and Ncumann, R., (Eds. Blackie Academic: London 1997). Phase transfer agents are useful for extracting a chemical species from one phase into another phase, where a reaction can occur. This is a form of heterogeneous catalysis; for example, water-soluble ionic reagents may be transported into organic solvents by phase transfer catalysts, and organic soluble reagents may be extracted from organic phases to aqueous solutions. In this last respect, phase transfer catalysts are "green" in that they permit the reduction or elimination of the need for organic solvents for some reactions. Phase transfer agents can also be used to transfer a chemical species from a solid phase to a liquid phase as is envisioned in some embodiments of the present methods.

Suitable phase transfer agents include, but are not limited to, quaternary ammonium compounds, quaternary phosphonium compounds, crown ethers, polyethylene glycols and tertiary amines. In some embodiments, the phase transfer agent is a quaternary organic ammonium compound. In other embodiments, the quaternary organic ammonium compound includes benzethonium chloride, cetylpyridinium chloride, methylbenzthionium chloride, benzalkonium chloride, cetalkonium chloride, cetrimonium chloride, cetrimonium bromide, didecyldimethylammonium chloride, dofanium chloride, domiphen bromide, tetraethylammonium bromide, carnitine, stearalkonium chloride, choline, cocamidopropyl betaine, Polyquaternium (an industry term for quaternary ammonium-containing polymers used in personal care products), tetra-n-butylammonium bromide, ALIQUAT 336, or tetramethylammonium chloride. In some embodiments, the phase transfer agent includes benzethonium chloride, cetylpyridinium chloride, methylbenzthionium chloride, benzalkonium chloride, cetalkonium chloride, cetrimonium chloride, cetrimonium bromide, didecyldimethylammonium chloride, or domiphen bromide. In illustrative embodiments, the phase transfer agent is cetylpyridinium chloride. Combinations of two or more phase transfer agents can also be included in the aqueous composition.

Suitable quaternary ammonium compounds, used as phase transfer agents, can also be represented by Formula I

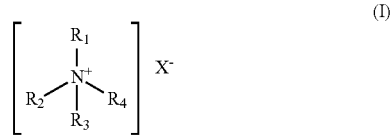

wherein
$R_1$, $R_2$, $R_3$, and $R_4$ may be the same or different and are independently selected from H, $C_1$-$C_{20}$ alkyl, $C_3$-$C_8$ cycloalkyl, heterocyclyl, $C_6$-$C_{10}$ aryl and heteroaryl groups, or $R_1$ and $R_2$ or $R_1$-$R_3$ together with the nitrogen atom to which they are bound are a part of heterocyclic ring system; and X— represents an anion including halides, hydroxides, sulphonates, phosphates, alkylphosphates, dialkylphosphates, borates, alkylborates, nitrites, nitrates, carbonates, bicarbonates, alkanoates, and O,O-dialkyldithiophosphates.

In some embodiments, the phase transfer agents of Formula I has an aryl group near the quaternary ammonium charge. This includes phase transfer agents of formula I, wherein at least one of $R_1$, $R_2$, $R_3$, and $R_4$ is an aryl group, which is attached to the quaternary ammonium nitrogen via a $C_1$-$C_6$ alkyl group. Thus, in some embodiments, the phase transfer agent is a compound of Formula I wherein at least one of $R_1$, $R_2$, $R_3$, and $R_4$ is a $C_6$-$C_{10}$ aralkyl or heteroaralkyl group. In other embodiments, the phase transfer agent is a compound of formula I wherein at least one of $R_1$, $R_2$, $R_3$, and $R_4$ is a $C_6$-$C_{10}$ aryl or heteroaryl group. Examples of such phase transfer agents include, but are not limited to, benzethonium chloride, cetylpyridinium chloride, methylbenzethonium chloride and benzalkonium chloride. Such compounds are able to associate with and tend to solvate the aryl rings of bisphenols. The Markush groups in compound of formula I can be substituted or unsubstituted.

In some embodiments, when used with consumer products, such as food and beverage packages, food-safe phase transfer agents which are approved for use in food service or personal care can be employed. Examples of such food-safe phase transfer agents include benzethonium chloride, benzalkonium chloride and cetylpyridinium chloride.

The phase transfer agents can be commercially obtained or can be synthesized using methods known in the art. For example, quaternary ammonium or phosphonium salts can be prepared by simple alkylation or arylation of tertiary amines and phosphines, respectively, and can be purified using recrystallization. In some embodiments, where, e.g., quaternary organic ammonium compound is used, it can be in the form of a quaternary ammonium hydroxide. This quaternary hydroxide can function both as a phase transfer agent and a base. Thus, in some embodiments, part or all of the phase transfer agent in the aqueous composition can be in the form of a quaternary hydroxide. In such cases, use of additional base would be optional. Quaternary hydroxides can be commercially obtained or can be readily prepared by reacting a quaternary salt such as quaternary chloride or bromide with silver oxide, potassium hydroxide or the like, or by passing the quaternary salt over a suitable ion exchange resin in the hydroxide form.

Depending on the concentration of bisphenol to be extracted and the phase transfer agent used, any suitable base which facilitates the deprotonation and dissolution of bisphenol into the aqueous composition can be used in the present methods. Suitable bases will be apparent to a person skilled in the art and may include, but are not limited to, alkali metal hydroxides, alkali metal oxides, alkali metal carbonates, alkali metal bicarbonates, organic bases, non-nucleophilic bases and quaternary ammonium hydroxides or combinations thereof. The alkali metal in the base includes both alkali metals or Group 1 metals, e.g., sodium, potassium, caesium, lithium and alkaline earth metals, or Group 2 metals, e.g., magnesium, calcium and the like.

In some embodiments, the base is a non-nucleophilic base. In some embodiments, the non-nucleophilic base includes tertiary amines or alkali metal carbonates. In some embodiments, the non-nucleophilic base includes a carbonate such as sodium carbonate, potassium carbonate, cesium carbonate and lithium carbonate; a trialkylamine such as triethylamine, and tributylamine; a phosphazine such as BTPP, BEMP or P4-t-butyl; or an organic base such as pyridine, quinoline, lithium diisopropylamide, lithium hexamethyldisilazide, N,N-dimethylaminopyridine, N,N-diisopropylethylamine, or 1,8-diazabicycloundec-7-ene. Without being bound by theory, it is believed that a suitable non-nucleophilic base would likely aid deprotonation and dissolution of free bisphenol without hydrolyzing the bisphenol bound to the polymer substrate.

The bisphenol extracted in to the aqueous composition can be further subjected to suitable processes such as oxidation, esterification, or re-polymerization. Alternatively, the bisphenol and other components in the aqueous extract can be separated for recycling, etc. Conventional chemical or biological water treatment methods suited for bisphenols may be used as well to treat the aqueous extract. Accordingly, in some embodiments, the extracted bisphenol is subjected to oxidation.

The oxidation can be effected simultaneously along with the extraction of the bisphenol or stepwise after the extraction is complete. Accordingly, in some embodiments, the aqueous composition includes an oxidant. Suitable oxidants which can oxidize bisphenols are known in the art. In some embodiments, the oxidant is a peroxide, a hypochlorite, ozone, oxygen, ozone, a nitrogen oxide, a molecular halogen, a nitrate salt, a manganate or permanganate salt, an inorganic peroxide, a halite, a hypohalite, a halogenate salt, a perhalogenate salt or combinations thereof. In some embodiments, the oxidant includes hydrogen peroxide, oxygen, ozone, chlorine, bromine or iodine. In other embodiments, the oxidant includes a chlorite salt, a hypochlorite salt, a chlorate salt or a perchlorate salt.

In some embodiments, the method further includes oxidizing the extracted bisphenol. Commonly known methods used for oxidation of phenols are known in the art and can be used to oxidize the extracted bisphenols. Such methods include, but are not limited to, electrochemical oxidation, enzymatic oxidation and photocatalytic oxidation.

In some embodiments, the oxidizing step is conducted by contacting the aqueous composition wash with an oxidant, for example, by adding an oxidant or solution thereof to the aqueous composition, by bubbling a gaseous oxidant through the aqueous composition, by contacting the aqueous composition wash with a suitable electrochemical potential, and the like. The oxidizing step may be conducted simultaneously in the presence of the polymeric substrate from which the bisphenol is extracted, or the bisphenol-containing aqueous composition may be directed elsewhere for the oxidizing step, e.g., to a holding tank or the like.

The optimum amounts of phase transfer agent, base, oxidant and other reagents will depend on the amount of bisphenol to be extracted and can be calculated by one skilled in the art using routine optimization techniques. The concentration of the phase transfer reagent, the base and the oxidant can be individually selected to provide a stoichiometric equivalence or excess depending on the expected amount of bisphenol to be extracted. For example, compared to the amount of bisphenol (corresponding to two equivalents of phenol), a range of about 2 to about 200 equivalents each of the phase transfer agent, the base and the oxidant can be employed. In some embodiments, about 3 to about 50 equivalents each of the phase transfer agent, the base and the oxidant can be employed. In some embodiments, about 4 to about 20 equivalents each of the phase transfer agent and the base can be employed. In other embodiments, about 2.5 to about 10 equivalents each of the phase transfer agent, the base and the oxidant can be employed. In some embodiments, the concentration of each of the phase transfer agent, the base and the oxidant is independently about 1 micromolar to about 1 molar, about 10 micromolar to about 100 millimolar, or about 10 micromolar to about 10 millimolar.

In some embodiments, suitable type and amount of base can be selected depending upon the desired pH of the aqueous composition. In some embodiments, the pH of the composition is from about 7 to about 14. In other embodiments, the pH of the composition is from about 9 to about 12. Specific examples of pH include about 9, about 10, about 11, about 12, and ranges between any two of these values. In some embodiments, the aqueous composition may be buffered at a desired pH by suitable buffering agents known to the art.

Parameters such as the temperature, pressure, and time of contact of the polymer substrate with the aqueous composition can also be optimized using standard procedures. For example, the process can be conducted at room temperature or elevated temperatures. In some embodiments, the substrate is contacted with the composition at a temperature of about 10° C. to about 300° C. In some embodiments, the substrate is contacted with the composition at a temperature of about 0° C. to about 150° C. In other embodiments, the substrate is contacted with the composition at a temperature of about 10° C. to about 90° C., or in certain embodiments, between about 20° C. to about 50° C. Specific examples of temperatures include about 20° C., about 30° C., about 40° C., about 50° C., about 60° C., about 70° C., about 80° C., about 90° C., about 100° C., about 110° C., about 120° C., about 130° C., about 140° C., about 150° C., and ranges between any two of these values. For high temperatures, the contacting can be done under pressure, and the pressure can be varied from standard atmospheric pressure to several atmospheres. Such conditions may support gas, vapor, or supercritical phases. The time of contact can be varied from about a few seconds to a few hours depending on the amount of bisphenol to be extracted. In some embodiments, the time of contact is about 5 minutes to about 300 minutes. In other embodiments, the time of contact is about 20 minutes to about 100 minutes. In certain embodiments, the time of contact is between about 1 second to about 5 minutes; in other embodiments, between about 1 second and about 60 seconds.

Although in some embodiments, the aqueous form of the composition which includes the phase transfer agent, the base and, optionally, the oxidant, is indicated, other forms such as foams or emulsions are also envisioned. For example, the composition can be prepared in the form of a foam by using the detergent function of the quaternary ammonium salt or by using another detergent or foaming agent in combination with a phase transfer agent. It is proposed that the ability of phase transfer agents to act as phase transfer catalyst between a solid polymer substrate such as a can lining and the liquid phase of the aqueous composition, can be enhanced by using the foam form of the aqueous composition. This is because the foam composition substantially reduces the mass requirement of the composition by several orders of magnitude, and yet allows the reagent concentration to be very high in the liquid phase within the foam membranes.

For the substrate materials, any polymer which includes bisphenols can be treated using the present methods. Examples of such polymeric substrate materials include containers of ingestible or injectable substances and articles which will contact skin or be implanted. In some embodiments, the polymeric substrate is a surface of an article designed to contact food, beverage, medicine, personal care products, bodily tissue, or bodily fluids. In some embodiments, the polymeric substrates can be dental implants. In other embodiments, the polymeric substrates can be compact discs, surgical equipments, water pipes or water tanks In some embodiments, the polymeric substrate comprises a bisphenol epoxy or a bisphenol polycarbonate. In some embodiments, the polymeric substrate is a Bisphenol-A epoxy can liner. In other embodiments, the polymeric substrate is a Bisphenol-A polycarbonate food or beverage container. Although polymer substrates are mentioned in some embodiments, other substrate materials which include bisphenols can also be considered for the present methods.

The aqueous compositions and methods of the present technology are used to transport the bisphenol from a polymer substrate to the aqueous solution. In an illustrative embodiment of the method, the aqueous composition is first prepared by combining, e.g., a quaternary ammonium compound, a base and, optionally, an oxidant in water. In other embodiments, the aqueous composition is prepared from a quaternary organic ammonium hydroxide and, optionally, an oxidant in water, where the quaternary organic ammonium hydroxide serves as both the phase transfer agent and the base. In various embodiments, the aqueous composition additionally contains other components, such as additional bases, buffers, electrolytes, detergents/surfactants, viscosity modifiers, or other agents suited to manufacturing, canning or cleaning processes. The prepared aqueous composition is then contacted with a polymeric substrate, such as BPA-containing can liners, thereby allowing extraction and optionally oxidation of the BPA to take place. After a suitable reaction time, the used aqueous composition is removed and the can liners rinsed with water or another solution suited to the canning process. The used aqueous solution and rinse water can be recycled or directed to conventional waste treatment.

In another aspect, a method for removing Bisphenol-A from food can linings is provided. In some embodiments, the method includes contacting the can lining with an aqueous composition, wherein the composition includes a) cetylpyridinium chloride, b) potassium carbonate or sodium carbonate, and c) sodium hypochlorite. The present technology provides compositions and methods which are simple, economical, effective and food-safe, can be easily integrated into canning or other manufacturing processes, and are compatible with existing linings. Lined cans can be washed with the basic aqueous composition that includes one or more phase transfer agents, a base and, optionally, an oxidant. It is believed that the phase transfer agents extract bisphenol from the lining and the oxidant degrades it. Notably, typical canning conditions can be employed with the aqueous composition to pre-stress the lining, thereby extracting the bisphenol that might otherwise be released during or after canning. An optional water rinse after the contacting stage leaves an intact lining suitable for food or beverage contact.

Without wishing to be bound by theory, it is hypothesized that the aqueous composition functions according to one or more of the following aspects. The bisphenol is extracted in a manner similar to phase transfer catalysis, where a phase transfer agent helps to extract a compound (e.g., BPA) from one phase (e.g., the solid phase of the can lining) to another phase (e.g., the aqueous composition). Such extraction is facilitated by functions, characteristics, or effects such as: typical phase transfer characteristics of the phase transfer agent; the presence of an aryl group in the phase transfer agent, which helps to solvate the aryl groups in the bisphenol via delocalization of charge; reaction of the bisphenol with the base to produce a bisphenol anion or dianion; ability of the phase transfer cation to function as a solvating counter-ion to the bisphenol anions; relatively lower oxidation potential of the bisphenol anions compared to bisphenols; possible driving force for extraction via removal of the bisphenol from the wash by oxidation, typical manufacturing conditions of temperature, pressure, etc., which are believed to release bisphenols from polymer substrates; enhanced solvation due to detergent, surfactant, emulsifying, or foaming effects of the phase transfer agent, and the like.

In yet another aspect, a composition is provided for use in the extraction of Bisphenol-A from a substrate. In some embodiments, the composition includes a phase transfer agent; an oxidant and a base for use in the extraction of Bisphenol-A from a substrate. In some embodiments, the composition includes a phase transfer agent. In some embodiments, the composition includes a phase transfer agent and a base. In other embodiments, the composition includes a phase transfer agent and an oxidant. In some embodiments, the substrate is a polymer substrate. Suitable phase transfer agents and bases for use in the composition are described herein. In some embodiments, the phase transfer agent includes benzethonium chloride, cetylpyridinium chloride, methylbenzethonium chloride and benzalkonium chloride. In some embodiments of the composition, the base is a non-nucleophilic base. In some embodiments, the base includes triethylamine, tributylamine, sodium carbonate or potassium carbonate. In an illustrative embodiment, the phase transfer agent is cetylpyridinium chloride and the base is potassium carbonate.

The present technology, thus generally described, will be understood more readily by reference to the following examples which are provided by way of illustration and are not intended to be limiting in any way.

EXAMPLES

The present technology is further illustrated by the following examples which should not be construed as limiting in any way.

Example 1

Preparation of Aqueous Composition

A laboratory BPA extraction experiment is expected to encounter a maximum BPA concentration of 0.0005 molar, or 0.001 molar in phenol (corresponding to two phenol groups in BPA). An effective aqueous composition for extraction of this quantity of BPA is prepared by combining 1 liter of water with 0.1 moles of sodium hydroxide, 0.1 moles of cetylpyridinium chloride and 0.1 moles of the oxidant sodium hypochlorite.

Example 2

Simultaneous Extraction and Oxidation of Bisphenol-A

The aqueous composition prepared in Example 1 is placed in contact with a BPA-containing can liner, stirred at room temperature, and monitored for pH. The composition is maintained at a pH of about 12. A control is prepared by contacting distilled water with a BPA-containing can liner under identical conditions. Aliquots of the aqueous composition and the control are taken at regular intervals and analyzed via HPLC-MS against standard solutions to determine concentration versus time of the phase transfer agent, BPA, and BPA oxidation products. The concentration of BPA and BPA oxidation products (mostly oxidation products as the oxidation is fast) rises for a period of time and then slows or levels off as the free BPA is extracted from the liner.

Example 3

Extraction and Electrochemical Oxidation of Bisphenol-A

A laboratory BPA extraction experiment is expected to encounter a maximum BPA concentration of 0.0005 molar or 0.001 molar in phenol. An effective aqueous composition is prepared by combining 1 liter of water with 0.1 moles of benzethonium hydroxide and 0.1 moles of lithium perchlorate as an electrolyte.

The wash solution is placed in contact with a BPA-containing can liner, stirred at 50° C., monitored for pH, and contacted with electrodes at a suitable oxidizing potential. A control is prepared by contacting distilled water with a BPA-containing can liner under identical conditions. Aliquots of the solution and the control are taken at regular intervals and analyzed via HPLC-MS against standard solutions to determine concentration versus time of the phase transfer agent, BPA, and BPA oxidation products, while the current at the electrodes is monitored to determine the extent of oxidation. The concentration of BPA and BPA oxidation products rises for a period of time and then slows or levels off as the free BPA is extracted from the liner.

Example 4

Multi-parameter Optimization for Extraction and Oxidation of Bisphenol-A

A laboratory BPA extraction experiment is expected to encounter a maximum BPA concentration of 0.0005 molar or 0.001 molar in phenol. A multi-parameter optimization study is conducted where the efficiency of BPA extraction and oxidation is determined as a function of temperature, pressure, time, and amount and type of base, oxidant, and phase transfer agent in order to find effective extraction and destruction of BPA while minimizing the time and cost of resources used.

Starting from initial parameters such as those in the preceding examples, the temperature, pressure, time, and amount and type of base, oxidant, and phase transfer agent are varied at a coarse grained level while aliquots of the solutions and a control are taken at regular intervals and analyzed via HPLC-MS against standard solutions to determine concentration versus time of the BPA and BPA oxidation products. For example, temperature can be varied from room temperature to 150° C. (temperatures higher than 100° C. under pressure); pressure can be varied from standard atmospheric pressure to several atmospheres; reagents can be varied from stoichiometric equivalence to high excess, e.g., 100 or 1000 fold or higher, and the like. Other ranges can be selected as desired. Analysis of these coarse grained experiments is used to develop a second series of experiments, where promising sub-ranges of the temperature, pressure, time, and amount and type of base, oxidant, and phase transfer agent from the coarse grained experiments are varied at a fine grained level. Analysis of the results of the fine-grained experiments reveals combinations of temperature, pressure, time, and amount and type of base, oxidant, and phase transfer agent which are optimized for BPA extraction efficiency versus time and resources.

Example 5

Scale-Up of Extraction and Oxidation of Bisphenol-A

Laboratory experiments such as in the preceding Examples identify expected maximum BPA concentrations from a sampling of lined cans in a can manufacturing or product canning facility. Further, such preceding experiments identify one or several sets of optimized aqueous compositions including phase transfer agents, base and oxidants (aqueous wash composition) and reaction conditions.

At a manufacturing plant, a can production or canning line is equipped with a washing station suitable for implementing the optimized aqueous compositions and reaction conditions. A multi-parameter production scale optimization study is prepared where the efficiency of BPA extraction and oxidation is determined as a function of various production line variables such as temperature, pressure, time, throughput, energy use, and the like, in order to find effective extraction and destruction of BPA at the production scale. The production line variables are monitored and varied while aliquots of the aqueous wash composition are taken at regular intervals and analyzed via HPLC-MS against standard solutions to determine concentration versus time of the BPA and BPA oxidation products. Analysis of these experiments is used to adapt and optimize the aqueous wash composition as well as the process to the particular production line.

EQUIVALENTS

While certain embodiments have been illustrated and described, it should be understood that changes and modifications can be made therein in accordance with ordinary skill in the art without departing from the technology in its broader aspects as defined in the following claims.

The embodiments, illustratively described herein, may suitably be practiced in the absence of any element or elements, limitation or limitations, not specifically disclosed herein. Thus, for example, the terms "comprising," "including," "containing," etc., shall be read expansively and without limitation. Additionally, the terms and expressions employed herein have been used as terms of description and not of limitation, and there is no intention in the use of such terms and expressions of excluding any equivalents of the features shown and described, or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only and is not intended to be limiting.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," "greater than," "less than," and the like, include the number recited and refer to ranges which can be subsequently broken down into subranges as discussed above. Finally, as will be understood by one skilled in the art, a range includes each individual member.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for extracting a bisphenol from a polymer substrate comprising:
   contacting the polymer substrate with an aqueous composition comprising a phase transfer agent and a base, whereby the bisphenol is extracted in to the aqueous composition;
   wherein:
   the phase transfer agent is a quaternary organic ammonium compound of Formula I:

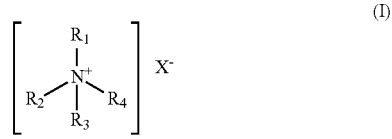

$R_1$, $R_2$, $R_3$, and $R_4$ may be the same or different and are independently selected from H, $C_1$-$C_{20}$ alkyl, $C_3$-$C_8$ cycloalkyl, heterocyclyl, $C_6$-$C_{10}$ aryl and heteroaryl groups, or $R_1$ and $R_2$ or $R_1$-$R_3$ together with the nitrogen atom to which they are bound are a part of heterocyclic ring system and at least one of $R_1$, $R_2$, $R_3$, and $R_4$ is a $C_6$-$C_{10}$ aryl or heteroaryl group; and
   X- represents an anion comprising halide, hydroxide, sulphonate, phosphate, alkylphosphate, dialkylphosphate, borate, alkylborate, nitrite, nitrate, carbonate, bicarbonate, alkanoate, or O,O-dialkyldithiophosphate.

2. The method of claim 1, wherein the bisphenol is Bisphenol-A.

3. The method of claim 1, wherein the base comprises an alkali metal hydroxide, an alkali metal oxide, an alkali metal carbonate, an alkali metal bicarbonate, an organic base, a non-nucleophilic base or a quaternary ammonium hydroxide.

4. The method of claim 1, wherein the base comprises sodium carbonate, potassium carbonate, cesium carbonate, lithium carbonate, triethylamine, tributylamine, pyridine, quinoline, lithium diisopropylamide, lithium hexamethyldisilazide, N,N-Dimethylaminopyridine, N,N-Diisopropylethylamine or 1,8-Diazabicycloundec-7-ene.

5. The method of claim 1, wherein the composition further comprises a peroxide, a hypochlorite, ozone, oxygen, ozone, a nitrogen oxide, a molecular halogen, a nitrate salt, a manganate or permanganate salt, an inorganic peroxide, a halite, a hypohalite, a halogenate or a perhalogenate salt.

6. The method of claim 1, wherein the composition further comprises oxygen, ozone, chlorine, bromine, or iodine.

7. The method of claim 1, wherein the composition further comprises a chlorite salt, a hypochlorite salt, a chlorate salt, or a perchlorate salt.

8. The method of claim 1, further comprising the step of oxidizing the extracted bisphenol.

9. The method of claim 8, wherein the oxidizing step comprises electrochemical oxidation, enzymatic oxidation or photocatalytic oxidation.

10. The method of claim 1, wherein the polymer substrate comprises a bisphenol epoxy or a bisphenol polycarbonate.

11. The method of claim 10, wherein the polymer substrate is a Bisphenol-A epoxy can liner.

12. The method of claim 10, wherein the polymer substrate is a Bisphenol-A polycarbonate food or beverage container.

13. The method of claim 1, wherein the pH of the composition is about 9 to about 12.

14. The method of claim 1, wherein the polymer substrate is contacted with the composition at a temperature of about 0° C. to about 150° C.

15. A method for removing Bisphenol-A from food can linings, the method comprising contacting the can lining with a composition comprising a) cetylpyridinium chloride, b) potassium carbonate or sodium carbonate, and c) sodium hypochlorite.

16. A method for extracting a bisphenol from a polymer substrate comprising:
   contacting the polymer substrate with an aqueous composition comprising a phase transfer agent and a base, whereby the bisphenol is extracted in to the aqueous composition;
   wherein: the phase transfer agent comprises benzethonium chloride, cetylpyridinium chloride, methylbenzthionium chloride, benzalkonium chloride, cetalkonium chloride, cetrimonium chloride, cetrimide, didecyldimethylammonium chloride, or domiphen bromide.

17. The method of claim 16, wherein the bisphenol is Bisphenol-A.

18. The method of claim 16, wherein the base comprises an alkali metal hydroxide, an alkali metal oxide, an alkali metal carbonate, an alkali metal bicarbonate, an organic base, a non-nucleophilic base or a quaternary ammonium hydroxide.

19. The method of claim 16, wherein the base comprises sodium carbonate, potassium carbonate, cesium carbonate, lithium carbonate, triethylamine, tributylamine, pyridine, quinoline, lithium diisopropylamide, lithium hexamethyldisilazide, N,N-Dimethylaminopyridine, N,N-Diisopropylethylamine or 1,8-Diazabicycloundec-7-ene.

20. The method of claim 16, wherein the composition further comprises a peroxide, a hypochlorite, ozone, oxygen, ozone, a nitrogen oxide, a molecular halogen, a nitrate salt, a manganate or permanganate salt, an inorganic peroxide, a halite, a hypohalite, a halogenate or a perhalogenate salt.

21. The method of claim 16, wherein the composition further comprises oxygen, ozone, chlorine, bromine, or iodine.

22. The method of claim 16, wherein the composition further comprises a chlorite salt, a hypochlorite salt, a chlorate salt, or a perchlorate salt.

23. The method of claim 16, further comprising the step of oxidizing the extracted bisphenol.

24. The method of claim 23, wherein the oxidizing step comprises electrochemical oxidation, enzymatic oxidation or photocatalytic oxidation.

25. The method of claim 16, wherein the polymer substrate comprises a bisphenol epoxy or a bisphenol polycarbonate.

26. The method of claim 16, wherein the polymer substrate is a Bisphenol-A epoxy can liner.

27. The method of claim 16, wherein the polymer substrate is a Bisphenol-A polycarbonate food or beverage container.

28. The method of claim 16 wherein the pH of the composition is about 9 to about 12.

29. The method of claim 16, wherein the polymer substrate is contacted with the composition at a temperature of about 0° C. to about 150° C.

* * * * *

UNITED STATES PATENT AND TRADEMARK OFFICE
CERTIFICATE OF CORRECTION

| | | |
|---|---|---|
| PATENT NO. | : 8,709,166 B2 | Page 1 of 1 |
| APPLICATION NO. | : 13/126115 | |
| DATED | : April 29, 2014 | |
| INVENTOR(S) | : Anderson | |

It is certified that error appears in the above-identified patent and that said Letters Patent is hereby corrected as shown below:

In the Specification

In Column 10, Line 44, delete "tanks" and insert -- tanks. --, therefor.

In the Claims

In Column 15, Line 59, in Claim 5, delete "oxygen, ozone," and insert -- oxygen, --, therefor.

In Column 16, Lines 47-48, in Claim 20, delete "oxygen, ozone," and insert -- oxygen, --, therefor.

Signed and Sealed this
Ninth Day of September, 2014

Michelle K. Lee
*Deputy Director of the United States Patent and Trademark Office*